United States Patent
Chomyn

[11] Patent Number: 5,858,213
[45] Date of Patent: Jan. 12, 1999

[54] MONITORING FOR COKE FORMATION DURING HYDROCARBON FEED PROCESSING

[75] Inventor: Karl D. Chomyn, Denville, N.J.

[73] Assignee: Exxon Research and Engineering Company, Florham Park, N.J.

[21] Appl. No.: 688,319

[22] Filed: Jul. 30, 1996

[51] Int. Cl.⁶ .................................................. B01P 3/42
[52] U.S. Cl. ...................... 208/350; 436/139; 208/DIG. 1
[58] Field of Search .............................. 208/DIG. 1, 350; 436/139

[56] References Cited

U.S. PATENT DOCUMENTS

| | | | |
|---|---|---|---|
| 3,824,388 | 7/1974 | Cugini | 208/DIG. 1 |
| 4,751,187 | 6/1988 | Dickakian | 436/139 |
| 4,752,587 | 6/1988 | Dickakian | 436/139 |
| 4,853,337 | 8/1989 | Dickakian | 436/55 |
| 4,904,604 | 2/1990 | Kivlen | 436/139 |
| 5,132,225 | 7/1992 | Dickakian | 436/139 |

*Primary Examiner*—Walter D. Griffin
*Assistant Examiner*—Nadine Preisch
*Attorney, Agent, or Firm*—Roy J. Ott

[57] ABSTRACT

Incipient coke formation during hydrocarbon processing operations is detected by monitoring for $C_{6-}$-fractions in heated hydrocarbon materials. The amount of $C_{6-}$-fraction is an indication of the coke-forming tendency of the hydrocarbon materials.

5 Claims, 1 Drawing Sheet

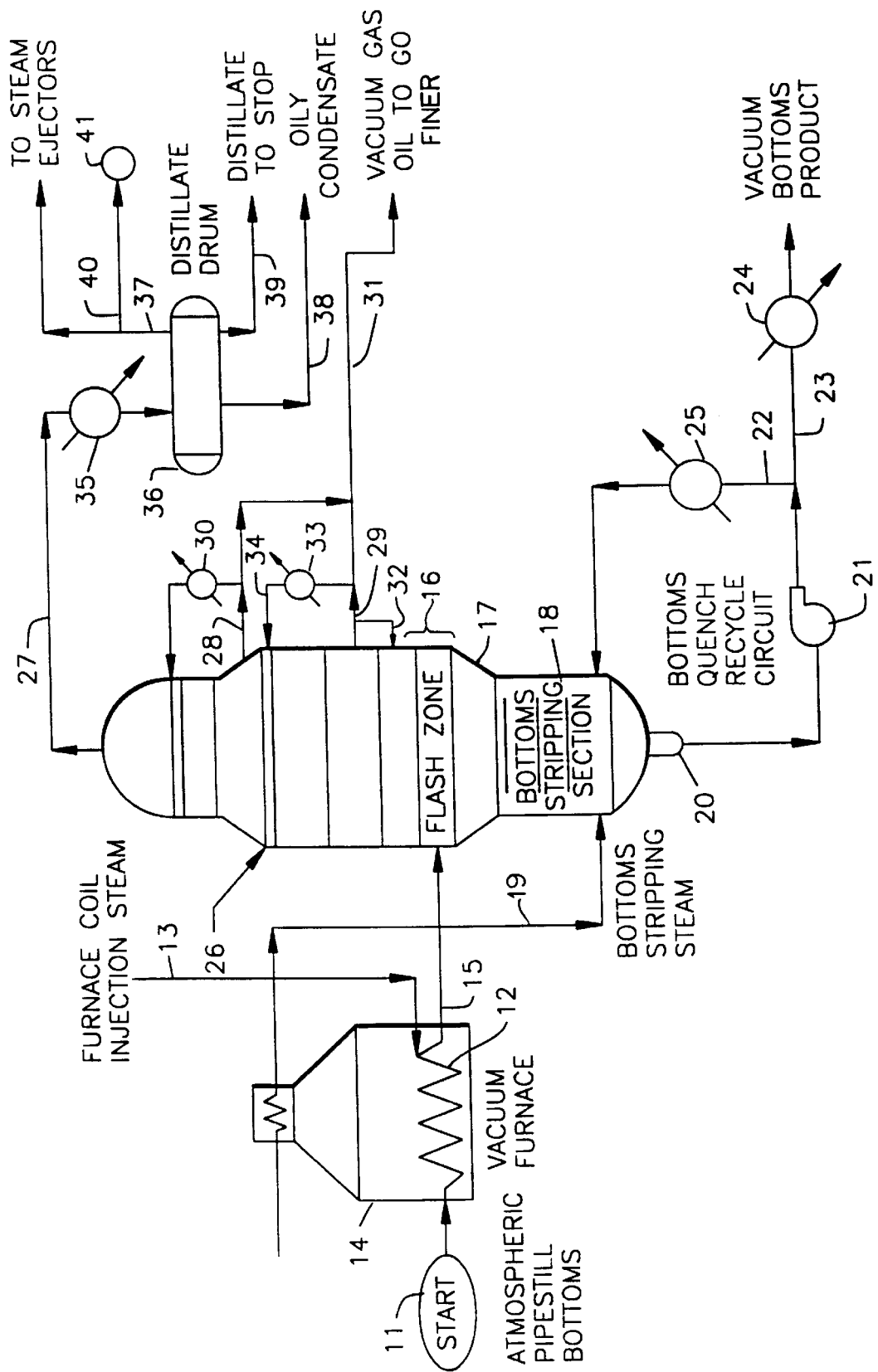

5,858,213

MONITORING FOR COKE FORMATION DURING HYDROCARBON FEED PROCESSING

BACKGROUND OF THE INVENTION

1. Field of the Invention

The present invention relates to a method and apparatus for monitoring incipient and/or actual coke formation during the processing of a hydrocarbon-containing feedstock in a processing zone.

2. Description of the Related Art

The processing of a hydrocarbon-containing feedstock at elevated temperatures in a processing zone, such as a furnace, heat exchanger, distillation tower or other equipment, can result in the formation of carbonaceous substances which can deposit on surfaces of the equipment. Such carbonaceous substances are generally referred to as "coke" in the fields of petroleum refining and petro-chemical processes.

Coke deposition on equipment surfaces is undesirable since it alters the operation of the equipment, usually in an undesirable manner.

The chemical and physical factors involved in the formation of coke have not been fully elucidated, and the propensity of certain feedstocks to form coke, and the rate at which coke is actually formed and deposited have heretofore not been determinable in industrial plant such as petroleum refineries and petrochemical works. As a result, maintenance schedules which take account of deterioration in process and equipment performance due to coke have not been very accurate.

An object of the present invention is to provide a method and apparatus for monitoring incipient and/or actual coke formation during the contacting of a hydrocarbon-containing feedstock with hot surfaces, such as the heating surfaces of a heating furnace or the internal structures of a distillation tower.

SUMMARY OF THE INVENTION

The present invention provides a method of detecting coke formation and/or incipient coke formation in the processing at elevated temperature, of a hydrocarbon-containing feedstock boiling above a specified temperature, in a processing zone, comprising monitoring and/or determining in the heated feedstock or part thereof the amount of gas and hydrocarbon material boiling below the specified temperature.

BRIEF DESCRIPTION OF THE DRAWING

The FIGURE is a flow diagram of a preferred embodiment of the invention.

DESCRIPTION OF THE PREFERRED EMBODIMENT

The processing zone may be a continuously-operated heating furnace and/or distillation zone which may be continuously supplied with feedstock.

The heated feedstock may be separated into a plurality of fractions and at least one fraction may be monitored or inspected for its content of material boiling below the specified temperature. The said separation may be effected in a flash zone and/or a distillation zone.

The processing zone may comprise a hydrocarbons-heating furnace.

The feedstock may be a residue or topped crude from the distillation or topping of a residue-containing hydrocarbon feedstock.

The feedstock may be an atmospheric residue from atmospheric distillation of a residue-containing hydrocarbon feedstock.

The said material may be at least a part of a $C_{6-}$ fraction.

In another aspect, the invention provides apparatus comprising a processing zone for processing at elevated temperature a hydrocarbon-containing feedstock boiling above a specified temperature, and means for monitoring and/or determining in the feedstock or part thereof, during or after processing, the amount of gas and hydrocarbon material boiling below the specified temperature.

The processing zone may comprise a continuously-operated furnace for heating the feedstock, and/or a separation zone connected for receiving heated feedstock from the furnace, the heated feedstock separating in the separation zone into relatively lower boiling and relatively higher boiling fractions, said monitoring and/or determining means being operative to monitor and/or determine gas and hydrocarbon material boiling below the said specified temperature in at least one fraction.

The said monitoring and/or determining means may operate to monitor and/or determine $C_{6-}$ materials.

In a preferred embodiment, the feedstock is a heavy hydrocarbon-containing material, such as a topped crude or atmospheric residuum from distillation at substantially atmospheric pressure. Such feedstocks tend to have a strong propensity to form coke when subjected to heating (e.g., in a vacuum distillation tower and/or in a heating furnace for such a tower). It has been discovered that the propensity to form coke, and the actual formation of coke is accompanied by the formation of low-boiling products, typically $C_{6-}$, and that the products of such low-boiling products can be correlated with coke formation. The term "$C_{6-}$" indicates, in this patent specification, moieties having 6 or fewer carbon atoms per molecule (including moieties, such as hydrogen, containing no carbon).

The invention is now further described by reference to a non-limitative embodiment thereof, given by way of example only, and illustrated in the accompanying drawing which is a flow-sheet of the combination of a furnace for heating atmospheric residue from an atmospheric distillation tower with a vacuum distillation tower and some ancillary equipment as used in petroleum refineries. The flow-sheet shows only those items of equipment which are necessary for an understanding of the invention.

In the flow-sheet, a hydrocarbon-containing feedstock which tends to form carbon deposits is the starting material. The feedstock in this instance is an atmospheric residue from the distillation of crude petroleum oil under substantially atmospheric pressure, and is indicated by reference 11. The feedstock is fed to the heating coils 12 of a heating furnace 14 so that its temperature is raised sufficiently for separation into different fractions in a subsequent distillation operation, described below. Steam is injected from a steam line 13 into downstream sections of the heating coil 12 to promote feedstock vaporization and reduce coke formation, and the resulting feedstock/steam mixture, after further heating in the furnace 14, passes via a transferline 15 to a flash zone 16 of a distillation tower 17 operating under sub-atmospheric pressure.

The feedstock/steam mixture separates in the flash zone into vapour-phase materials which rise upwards from the flash zone, and liquid phase materials which pass downwardly to the bottoms stripping section 18. High temperature steam is passed from a steam line 19 into the bottoms stripping section 18 where it vaporizes and strips relatively lighter hydrocarbon material from the relatively heavier hydrocarbon material.

The stripped heavier hydrocarbon material is recovered in a bottoms tar pot 20 from where it is circulated by a pump 21 partly to a recycle line 22, and the remainder to a discharge line 23.

The hydrocarbon material in the discharge line 23 is cooled in a heat exchanger 24 before being discharged to a storage zone (not shown).

The hydrocarbon material in the recycle line 22 is heated in heat exchanger 25 and passed into the bottoms stripping section in order to maintain the temperature gradient from the bottom to the top of the tower 17.

The upper region 26 of the tower 17 contains distillation trays or plates. The lightest materials (i e., lowest molecular weight materials) are recovered at the top via line 27, and progressively heavier materials are recovered from progressively lower parts of the upper region, respectively via light vacuum gas oil (LVGO) line 28 and heavy vacuum gas oil (HVGO) line 29. Some LVGO from line 28 is heated in heat exchanger 30 and passed into the tower 17 at a location above that of line 29 so as to serve as downflowing reflux. The remaining LVGO is recovered in line 31.

The HVGO recovered in line 29 is in part returned to the tower 17 at a lower location via line 32, and a further part is heated in a heat exchanger 33 and passed into the tower 17 at a higher location as reflux from line 34. The remaining HVGO is recovered with the LVGO in line 31, and the mixed vacuum gas oils are usually further refined (not described or shown) to enhance their utility.

The lightest materials recovered in line 27 are cooled in a heat exchanger 35 to condense the heavier components thereof (e.g., $C_{7+}$ components). The cooled materials are received in a drum 36 which is maintained under low pressure by the action of steam ejectors (not shown) or equivalent means connected to the drum via line 37.

Within the drum, the condensed liquids are separated by well-known expedients into an oily condensate, recovered via line 38 and a slop distillate, which is discharged via line 39.

The lightest materials (e.g., $C_{6-}$ components) are evacuated from the drum 36 via line 37.

All of the foregoing is substantially conventional and well-known to those skilled in the art.

In accordance with the principles of the invention, it has been observed that the propensity for hydrocarbon material to form carbonaceous material which can manifest itself as coke deposits on equipment correlates with the amount of low-boiling product material, and more particularly (but not exclusively) with the amount of $C_6$-product material, in line 37. While there is no complete explanation of this correlation, it is hypothesized that the tendency to form carbonaceous materials during the type of processing described is related to a proclivity to thermal-type cracking or pyrolysis phenomena in the hydrocarbon materials at different parts of the described processing system. Thus, a feedstock 11 containing components with a marked tendency to pyrolyze or crack when exposed to typical elevated temperatures encountered during the normal operation of the processing system of the flow-sheet has been observed to produce more $C_{6-}$ components in line 37 than a feedstock having a lower pyrolysis proclivity. Typically, thermal cracking or pyrolysis occurs in the heating coils 12 of the furnace 14, in the bottoms stripping sections 18 of the vacuum distillation tower 17, and in the heater 25 in the bottoms product recycle line 22. Thermal cracking or pyrolysis can result in the deposition of coke in the coils 12 and in the bottoms stripping section 18 of the tower 17 and in the heat exchanger 25. The deposition of coke reduces the efficiency of equipment and is undesirable.

In accordance with the invention, samples of the light material evacuated from the distillate drum 36 via line 37 are removed via a sampling line 40 either continuously or intermittently, and the amount of $C_6$ material therein is determined by an analyzer 41 in any convenient manner, e.g., by cooling each sample and measuring the amount of $C_{6-}$ material or specific features thereof, such as the amount of "non-condensible" materials (e.g., selected from hydrogen, methane, ethane, ethylene, etc. or any suitable or convenient combination thereof).

A relatively high amount of light material is indicative of relatively high thermal cracking or pyrolysis and is therefore indicative of a relatively high propensity of the feedstock to deposit coke under the operating conditions of the plant. For most feedstocks, a reduction in the maximum temperatures usually reduces the propensity of a feedstock to deposit coke, and this is evidenced by a corresponding reduction in the amount of light material in line 37, e.g. as determined by the analyzer 41.

For a feedstock 11 which has an unacceptably high tendency to form coke deposits, various expedients to reduce coke formation will be apparent to a person skilled in the art. For example, the peak temperatures in the heating coil 12 and/or in the bottoms stripping section 18 and/or in the heater 25 might be reduced. Alternatively or in addition, the rate of steam injection via line 13 and/or via line 19 can be increased. Further expedients include reducing the residence time in the heating coil 12 and/or in the bottoms stripping section 18 and/or in the heater 25.

Although the invention has been described specifically with reference to a vacuum distillation plant for atmospheric residuum from atmospheric distillation of crude petroleum oil, a person skilled in the art will understand and appreciate that the invention has wider utility within the petroleum refining and petrochemical and chemical industries, more generally.

I claim:

1. A method of detecting and reducing coke formation or incipient coke formation in the processing in a processing zone at elevated temperature, of a hydrocarbon-containing feedstock having an initial boiling point below the elevated temperature, comprising (a) monitoring or determining in a heated feedstock or part thereof the amount of gas and hydrocarboon material boiling below the initial boiling point of the feedstock and (b) reducing (i) the elevated temperature or (ii) the residence time of the feedstock in the processing zone to reduce coke formation in the processing zone when the amount of gas and hydrocarbon material exceeds a predetermined level.

2. The method of claim 1 wherein the processing zone is a continuously-operated heating furnace or distillation zone which is continuously supplied with feedstock.

3. The method of claim 1 wherein the heated feedstock is separated into a plurality of fractions and at least one fraction is monitored or inspected for its content of material boiling below the initial boiling point.

4. The method of claim 3 wherein the feedstock is an atmospheric resid from atmospheric distillation of a resid-containing hydrocarbon feedstock.

5. The method of claim 1 wherein the said material is at least a part of a $C_{6-}$ fraction.

* * * * *